Nov. 5, 1929.  W. F. BORN  1,734,937
AUTOMATIC WINDSHIELD WIPER
Filed March 29, 1928
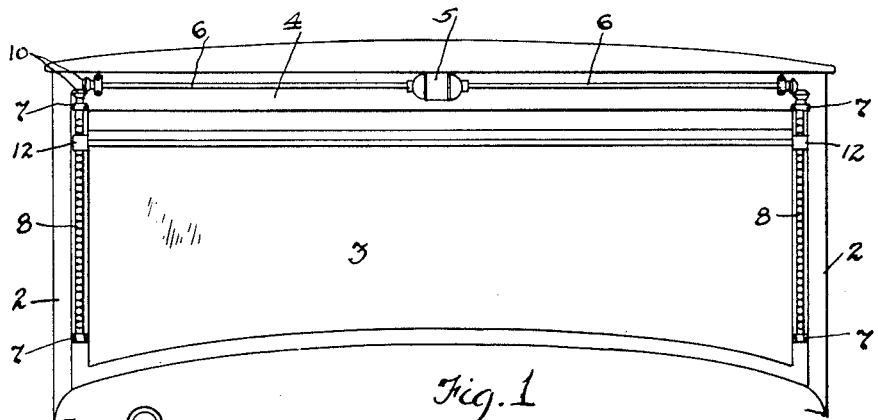
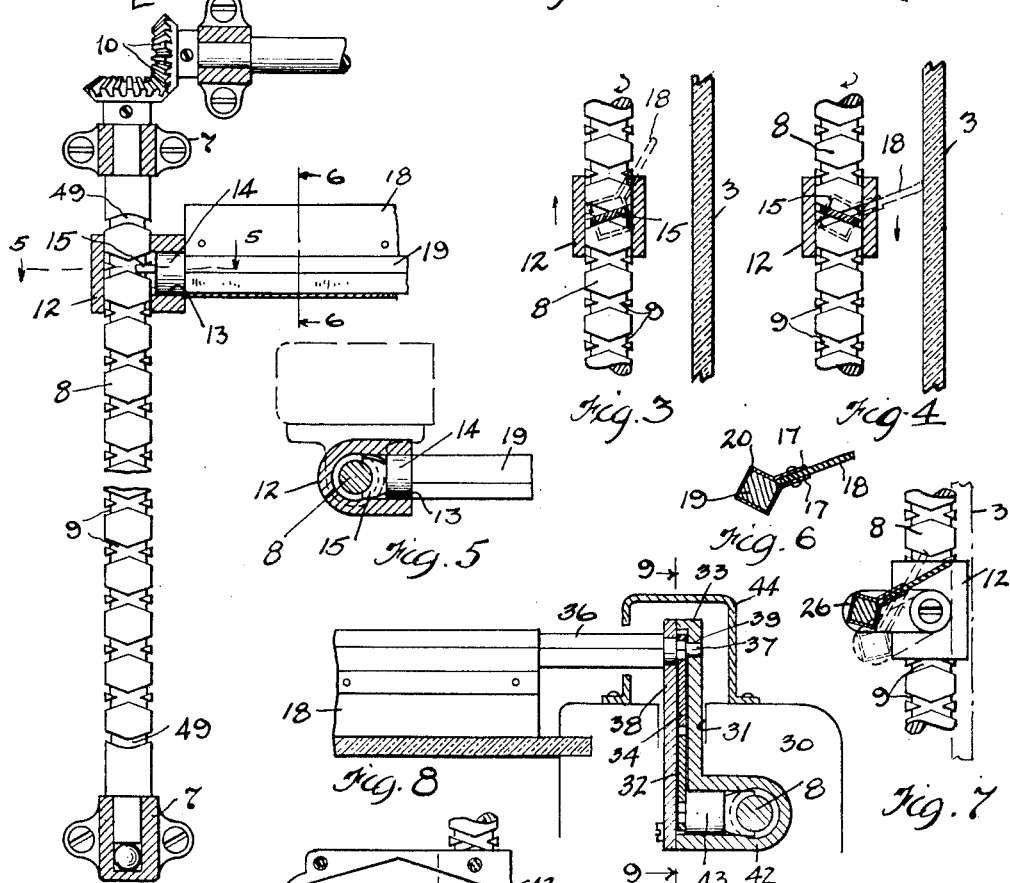
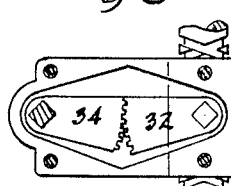
INVENTOR.
William F. Born
BY
Fay Oberlin & Fay
ATTORNEYS.

Patented Nov. 5, 1929

1,734,937

UNITED STATES PATENT OFFICE

WILLIAM F. BORN, OF LAKEWOOD, OHIO, ASSIGNOR TO REES R. ROBERTS, OF LAKEWOOD, OHIO

AUTOMATIC WINDSHIELD WIPER

Application filed March 29, 1928. Serial No. 265,548.

The present invention relates to windshield construction and wipers therefor. The object of the invention is to provide a wiper or squeegee which will move vertically across the entire windshield glass and which will automatically reverse its direction. Another object is to obtain a squeegee which is pressed against the glass during its downward movement and tilted away from the glass during its upward movement. In the present construction this action is positive and is obtained directly from the driving mechanism. Another object is to mount the operating mechanism within the windshield or body posts to furnish a self-contained built-in unit. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:

Fig. 1 is a front elevational view of a windshield showing my improved wiper mechanism thereon: Fig. 2 is an elevational view of one shaft showing the driving mechanism and the carrier mechanism; Figs. 3 and 4 are diagrammatic sectional views through the the wiper and glass showing the position of the wiper in its upward and downward travel, respectively; Fig. 5 is a section on line 5—5 of Fig. 2; Fig. 6 is a section on line 6—6 of Fig. 2; Fig. 7 is an elevational view showing a modified carrier and pawl construction; Fig. 8 is a horizontal sectional view showing the device incorporated in the windshield posts; and Fig. 9 is a view on the line 9—9 of Fig. 8.

In the present invention, as shown in Fig. 1, there is shown a windshield or front body of an automobile with the usual corner posts 2, the windshield glass 3, and the top windshield cross piece 4. In the form shown in Fig. 1, a motor 5 of any suitable type, such as electric, magnetic or suction, is mounted on the cross piece 4 and is connected to two horizontal driving shafts 6. Attached to each corner post 2 in suitable bearing brackets 7 is a vertical shaft 8 provided with double screw threads 9 which are connected at their ends 49 to make a continuous double thread. As shown, the vertical shafts are driven from the horizontal shafts through bevel gearing 10, but any suitable driving means may be employed for rotating the vertical shafts synchronously and in one direction, the form shown merely illustrating one convenient manner of driving the shafts.

The carriers or travellers 12 which are mounted on the shafts are hollow bushings of sufficient length to travel freely and each carrier has an inwardly extending opening 13 in which is mounted a pawl 14 having an end 15 adapted to engage with the screw threads 9 of the shaft. This pawl may rotate and will rock or change its angle position as the pawl passes through the connecting thread portion 49.

Carried by the pawls is a wiper rod 19, this rod being preferably squared at the ends 16 and filling into complementary formed sockets in the pawls. Figs. 3 and 4 illustrate the position of the pawls and wiper rod during its travel, Fig. 3 illustrating its position during upward movement with the wiper rod 19 turned so that the wiper 18 mounted thereon is pivoted away from the windshield glass 3. During its downward movement when the pawl ends are engaged in the other thread of the shaft, the wiper rod 19 is pivoted toward the glass to press the wiper into engagement therewith, as shown in Fig. 4.

The rubber wiper 18 is a strip or strips of rubber, or other material which is held between the extending edges 17 of a sheet metal member 20 shaped to fit the square wiper rod 19, although any other suitable form of squeegee might be employed.

In Fig. 7 a slightly modified construction is shown, and this is employed where it is necessary to space the wiper rod away from the glass. The pawl 26 of this form has an offset end which is apertured to receive the wiper rod and when the pawl rocks in changing screw threads, the offset end moves from its wiping position shown in full lines to its free position shown in dotted lines.

In Figs. 8 and 9 the present mechanism is shown as built into the corner posts of the auto. In this form, the corner post 30 is hollow and is provided with an outwardly facing vertical slot 31. The shaft 8 is mounted within the corner post and the carrier 42 is an L-shaped member. The free end of the pawl 43 extends into the leg of the L and has a segmental gear member 32 secured thereto. At the outer end 33 of the leg of the L which extends out of the slot is pivotally mounted a second segmental gear member 34 in mesh with said first member, this latter member being secured to the end of the wiper rod 36 which has one end 37 mounted in the inner portion 39 of the carrier leg and the second bearing in the outer removable portion 38 of the leg. Rocking of the pawl will actuate the segmental gear member to rock the wiper rod, and wipe carried thereon. To form a housing for the carrier, a slotted channel 44 is mounted on the corner post.

The present form of wiper thus provides up and down motion of the wiper or squeegee which is advantageous as most objects in the driver's vision are moving in a transverse direction. It also provides for the squeegee to wipe the glass during downward movement, and thus all dirt is wiped off the glass and is not moved back and forth. The movement of the wiper away from the glass is automatic and positive, and the wiper is positively pressed against the glass and held thereagainst by the position of the pawl. The position of the vertical shafts may be varied to suit structural conditions as the offset pawl ends may be used to properly space the wiper rod from the glass and the device may be readily incorporated into the body construction where the windshield is not of the tilting type. In built-in construction, the motor will preferably be mounted under the cowl and connected to the bottom of shafts 8 and the necessary speed reduction for use with the small type electric motor may be obtained from the pitch of the shaft threads themselves, or may be obtained through other means of speed reduction. It is of course clear, that the device may be driven from the vehicle power plant through any suitable driving means which will give fairly constant speeds to the device.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In windshield wiping mechanism, the combination of a shaft having connected double threads and extending vertically at each side of the windshield glass to be wiped, a carrier mounted on each shaft, a wiper and wiper rod mounted on said carriers, each of said carriers having means for engagement with said shafts to move said wiper back and forth across the windshield and to tilt the wiper away from said windshield during movement in one direction and means for rotating said shafts synchronously.

2. In windshield wiping mechanism, the combination of a shaft having connected double threads and extending vertically at each side of the windshield glass to be wiped, a carrier mounted on each shaft, each of said carriers having a pawl with means for engagement with said shaft threads, said pawl having rocking movement, a wiper rod connected to said pawls, a wiper on said rod, and means for continuously and synchronously rotating said shafts in one direction whereby said wiper will move back and forth across said windshield, said pawls and rods automatically rocking to move said wiper away from said shield during movement in one direction.

3. In windshield wiping mechanism, the combination of a shaft having connected double threads and extending vertically at each side of the windshield glass to be wiped, a carrier mounted on each shaft, each of said carriers having a pawl with means for engagement with said shaft threads, said pawls having a rocking movement as they change direction of movement at the connected thread ends, a wiper rod and wiper carried by said carriers and connected to said pawls to rock therewith, and means for continuously and synchronously rotating said shafts in one direction to obtain movement of said wiper back and forth across said windshield, the rocking of said pawls being adapted to tip said wiper away from said windshield during movement in one direction, and to force said wiper against said windshield during movement in the other direction.

4. An automobile windshield and wiper construction consisting of a windshield having corner posts provided with vertically extending slots, a shaft mounted in each corner post and provided with double screw threads connected together at the ends, power means mounted in said windshield structure and connected to said shafts to rotate the same continuously and synchronously, a carrier mounted on each shaft and having an extension passing through the corner post slot, a wiper rod mounted in the extending ends of said carriers, a wiper on said rod, a pawl in each carrier adapted to engage with said screw threads, said pawl rocking through a limited angle as it passes the connection between said double threads, means for connecting said pawls and said wiper rod to rock said rod from said pawls, whereby the wiper is forced into contact with the windshield glass during movement in one direction and tilted away from said windshield during movement in the opposite direction.

Signed by me this 27th day of March, 1928.

WILLIAM F. BORN.